US 11,619,782 B2

(12) United States Patent
Wang et al.

(10) Patent No.: US 11,619,782 B2
(45) Date of Patent: *Apr. 4, 2023

(54) SYSTEM AND METHOD FOR PROTECTING OPTICAL FIBRE SPLICE

(71) Applicant: COMMSCOPE TELECOMMUNICATIONS (SHANGHAI) CO. LTD., Shanghai (CN)

(72) Inventors: Liming Wang, Shanghai (CN); Xiaodong Zhang, Shanghai (CN)

(73) Assignee: CommScope Telecommunications (Shanghai) Co. Ltd., Shanghai (CN)

(*) Notice: Subject to any disclaimer, the term of this patent is extended or adjusted under 35 U.S.C. 154(b) by 39 days.

This patent is subject to a terminal disclaimer.

(21) Appl. No.: 17/060,996

(22) Filed: Oct. 1, 2020

(65) Prior Publication Data

US 2021/0103097 A1 Apr. 8, 2021

Related U.S. Application Data

(63) Continuation of application No. 15/532,885, filed as application No. PCT/CN2015/096315 on Dec. 3, 2015, now Pat. No. 10,845,540.

(30) Foreign Application Priority Data

Dec. 4, 2014 (CN) .......................... 201410741182.8

(51) Int. Cl.
*G02B 6/25* (2006.01)
*G02B 6/255* (2006.01)

(52) U.S. Cl.
CPC ................................ *G02B 6/2558* (2013.01)

(58) Field of Classification Search
CPC .... G02B 6/255; G02B 6/2551; G02B 6/2558; G02B 6/3825; G02B 6/3885
USPC ........................................ 385/78, 95, 96, 99
See application file for complete search history.

(56) References Cited

U.S. PATENT DOCUMENTS

| 4,077,702 A | 3/1978 | Kunze et al. |
| 4,254,865 A | 3/1981 | Pacey et al. |
| 4,714,316 A | 12/1987 | Moore et al. |
| 4,778,242 A | 10/1988 | Ota et al. |
| 5,102,212 A | 4/1992 | Patterson |
| 5,247,598 A | 9/1993 | Takimoto et al. |

(Continued)

FOREIGN PATENT DOCUMENTS

| CN | 1548492 A | 11/2004 |
| CN | 1735825 A | 2/2006 |

(Continued)

OTHER PUBLICATIONS

International Search Report and Written Opinion of the International Searching Authority for corresponding International Patent Application No. PCT/CN2015/096315 dated Mar. 7, 2016, 12 pgs.

(Continued)

*Primary Examiner* — Robert Tavlykaev
(74) *Attorney, Agent, or Firm* — Merchant & Gould P.C.

(57) ABSTRACT

The present invention relates to a low-profile splice protection system for protecting multi-fibre fusion splice sites. The splice protection system comprises coating material to package the splice site and may comprise a protective housing.

13 Claims, 15 Drawing Sheets

(56) References Cited

U.S. PATENT DOCUMENTS

| | | | |
|---|---|---|---|
| 5,367,591 A | 11/1994 | Seike et al. | |
| 5,416,873 A | 5/1995 | Huebscher et al. | |
| 5,731,051 A | 3/1998 | Fahey et al. | |
| 5,832,162 A | 11/1998 | Sarbell | |
| 6,485,199 B1 | 11/2002 | Ware et al. | |
| 6,676,299 B1 | 1/2004 | Durrant et al. | |
| 8,740,479 B2 | 6/2014 | Shitama et al. | |
| 8,824,841 B1 | 9/2014 | Mullen | |
| 2004/0062480 A1 | 4/2004 | Cronk et al. | |
| 2006/0093281 A1 | 5/2006 | Kesler | |
| 2012/0281951 A1 | 11/2012 | Takahashi et al. | |
| 2014/0321813 A1 | 10/2014 | Lu | |

FOREIGN PATENT DOCUMENTS

| | | | | |
|---|---|---|---|---|
| CN | 202494801 U | 10/2012 | | |
| DE | 43 30 744 A1 | 3/1995 | | |
| DE | 201 06 111 U1 | 7/2001 | | |
| DE | 20 2007 013 173 U | 1/2008 | | |
| JP | 2004-347801 A | 12/2004 | | |
| JP | 2005-250294 A | 9/2005 | | |
| WO | 2013/077969 A1 | 5/2013 | | |
| WO | WO 2013/077969 A1 * | 5/2013 | ............... | G02B 6/38 |
| WO | 2013/126429 A2 | 8/2013 | | |

OTHER PUBLICATIONS

Extended European Search Report for corresponding European Patent Application No. 15864740.4 dated Jul. 23, 2018, 8 pages.
Yablon, A., "Optical Fiber Fusion Splicing", Springer Berlin Heidelberg, 5 pgs. (2005).
Office Action for European Patent Application No. 15864740.4 dated May 10, 2022, 7 pages.

* cited by examiner

SYSTEM AND METHOD FOR PROTECTING OPTICAL FIBRE SPLICE

This application is a Continuation of U.S. patent application Ser. No. 15/532,885, filed Oct. 6, 2017, now U.S. Pat. No. 10,845,540, which is a National Stage entry of PCT/CN2015/096315, filed Dec. 3, 2015, which claims the benefit of Chinese Patent Application No. 201410741182.8, filed Dec. 4, 2014, the disclosures of which are hereby incorporated by reference in their entireties.

FIELD OF THE INVENTION

The present invention relates to an optical fibre connector and a method of manufacturing same. In particular, the present invention relates to protection for the splice site within the optical fibre connector.

BACKGROUND ART

Optical fibre communication systems are becoming widespread. In some areas, service providers wish to provide high-bandwidth telecommunication capabilities (such as data and voice) to customers. Optical fibre communication systems use optical cable networks to transmit large volumes of data and voice signals over relatively long distances. Optical fibre connectors are important components of most optical fibre communication systems. The optical fibre connectors allows rapid optical connection or disconnection of two optical fibres.

A typical optical fibre connector includes a ferrule or junction. A spring is used to press the ferrule upward, in a forward direction relative to the connector housing. The ferrule performs the role of supporting the end of at least one optical fibre. (In the case of most multi-fibre ferrules, the ends of multiple optical fibres are supported.) The ferrule has a front-end face, and the polished ends of the optical fibres are positioned at said front-end face. When two optical fibre connectors are connected to each other, the front-end faces of their respective ferrules are adjacent to each other, and the ferrules are pressed together by the spring load of their respective springs. When optical fibre connectors are connected, their respective optical fibres are generally coaxially aligned, with the result that the optical fibre end faces oppose each other directly. In such a manner, optical signals can be transmitted from optical fibre to optical fibre via aligned end faces.

Types of optical fibre connectors may include direct end-receiving optical fibre connectors and splice-on optical fibre connectors. Direct end-receiving optical fibre connectors have ferrules which directly receive their corresponding optical fibres. Conversely, splice-on optical connectors include ferrules that support optical fibre stubs. The optical fibre stubs are spliced to the corresponding optical fibres of optical cables. Exemplary publications that disclose splice-on connectors include patents with PCT international publication numbers WO 2013/126429 and WO 2013/077969. For splice-on optical fibre connectors, the ability to effectively and efficiently protect splice sites is an important design consideration. In this respect, it would be beneficial to provide a splice protection system which could be easily and quickly installed, that is suitable for small optical fibre structures, and that provides flexible protection for splice sites.

SUMMARY OF THE INVENTION

The guiding principles for the present disclosure are the need for a method and structure for effectively and efficiently protecting optical fibre splice sites within optical fibre connectors. Some aspects of the present invention relate to a splice protection method and structure suited to using splice-on multi-fibre optical connectors. Other aspects of the present invention relates to a method and structure for protecting multi-fibre splices within the connector body of an optical fibre connector providing a stable-environment and a sealed structure. A further aspect of the present invention relates to a low-profile splice protector, which is suitable for protecting a row of optical fibre splices (e.g., the site of multiple fusion splices) and is suitable for lateral mounting within the body of an optical fibre connector. In certain embodiments, the optical fibre splice is a fusion splice delimited between a first group of optical fibres and a second group of optical fibres. In addition, another aspect of the present invention relates to a splice protector, which: a) permits a row of splices between optical fibres to be effectively and laterally mounted within the splice protector; b) has a low profile which makes it easy to laterally mount the splice protector into the connector body; and c) is easily filled with a curable protective material such as adhesive cement, which is for filling the gaps within the splice protector and for stabilising, protecting, and mechanically strengthening the splice site. In one example, the splice protector may have a U-shaped profile when viewed in cross-section.

Another aspect of the present invention relates to a splice protection system for protection of fusion splice sites delimited between multiple first optical fibres and multiple second optical fibres. The splice protection system comprises: a splice protector, said splice protector comprising a sleeve, said sleeve comprising mutually perpendicular length, width, and thickness. The sleeve comprises a first main side and a second main side, which are opposite each other and are delimited by sleeve length and width. The first main side and the second main side comprise separated main side walls separated from each other by an intervening space extending along the thickness of the sleeve. The sleeve further comprises a first longitudinal secondary side and a second longitudinal secondary side positioned opposite each other and delimited by sleeve length and thickness. The sleeve further comprises a first lateral secondary side and a second lateral secondary side positioned opposite each other and delimited by sleeve width and thickness. The first and second lateral secondary sides are open lateral secondary sides. The width of the sleeve is at least twice the thickness of the sleeve. The splice site is disposed inside the sleeve of the splice protector. Said multiple first optical fibres and multiple second optical fibres extend outward from the first lateral secondary side and the second lateral secondary side of the splice protector sleeve. The splice protection system further comprises adhesive cement. The adhesive cement is disposed within the splice protector sleeve in order to fill the gaps within the splice protector sleeve.

In another aspect, the first longitudinal secondary side comprises a longitudinal wall. The longitudinal wall bridges the gap between said main side walls and interconnects said main side walls. Moreover, the first longitudinal secondary side is a closed longitudinal side, and the second longitudinal secondary side is an open longitudinal side. In another aspect, the sleeve could be formed from two matching half-shells.

Yet another aspect of the present invention relates to a method for protecting a splice site with a splice protector sleeve. Said splice site is delimited between the multiple first optical fibres and the multiple second optical fibres. The splice protector sleeve has a length, a width, and a thickness.

The splice protector sleeve comprises a first side wall, a second side wall opposite the first side wall, a third wall connecting the first side wall and the second side wall, and open ends. Said method comprises the steps below: (a) putting the splice site within the splice protector sleeve; (b) injecting adhesive cement into the splice protector sleeve and filling the gaps between the optical fibres and the splice protector sleeve; and (c) curing the adhesive cement.

Various supplementary aspects will be set forth in the description below. Each aspect relates to single features and to combinations of features. Please note that both the foregoing general description and the following detailed description are merely exemplary and illustrative and are not limitations on the broad inventive concepts on which the embodiments disclosed herein are based.

DRAWINGS

FIG. 1 presents an example of an optical cable connector device suitable for implementing the various aspects of the present invention.

Figure 3:
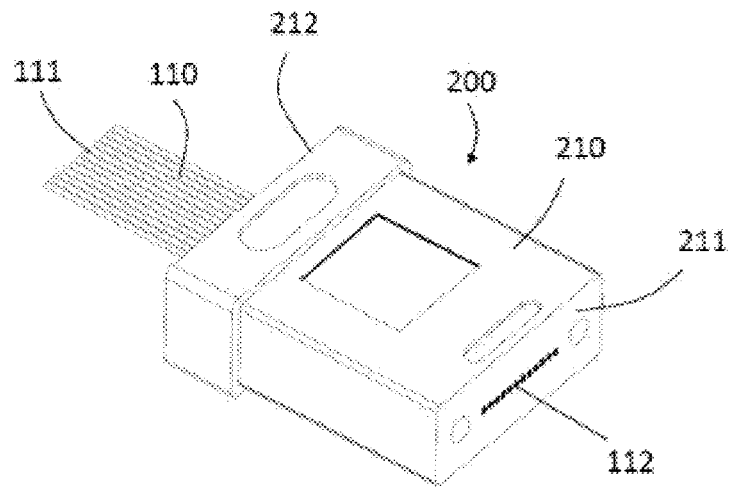
FIG. 3 is a three-dimensional diagram of a multi-fibre ferrule with optical fibre stubs that is suitable for use within the connector device in FIG. 2.
Figure 4:
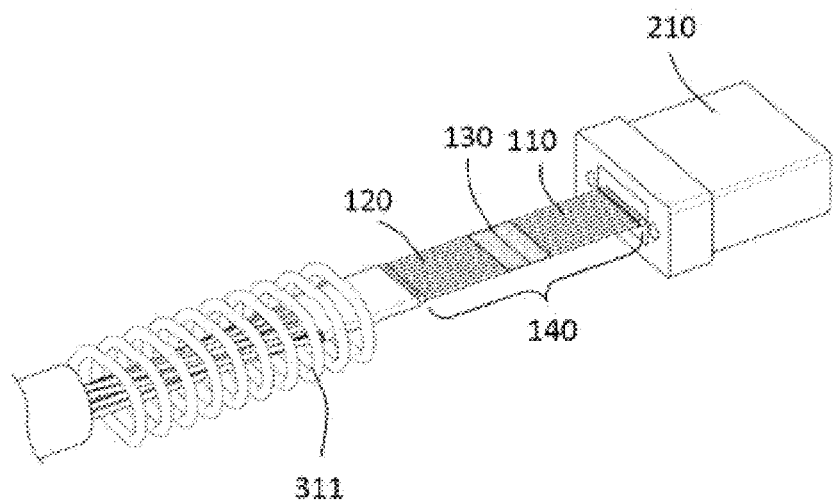

FIG. 4 presents the multi-fibre ferrule with optical fibre stubs in FIG. 3, said optical fibre stubs being spliced to the corresponding fibres of an optical cable.

Figure 5A:
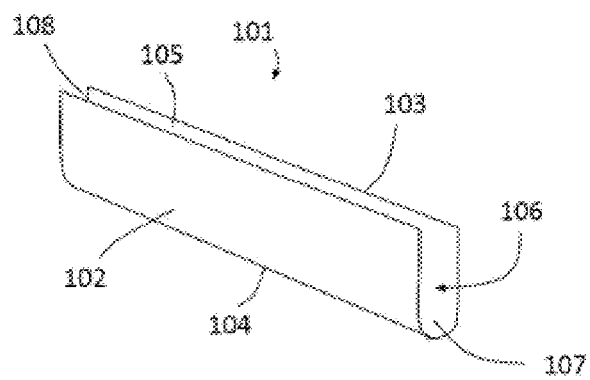

FIG. 5A is a perspective view of the splice protector for implementing the various aspects of the present invention.

Figure 5B:
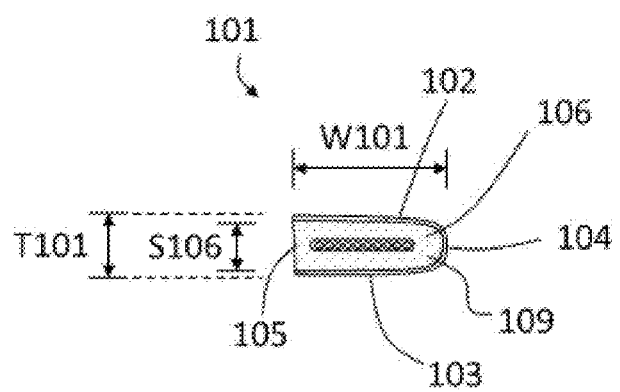

FIG. 5B presents a lateral view of the splice protector of FIG. 5A.

Figure 5C:
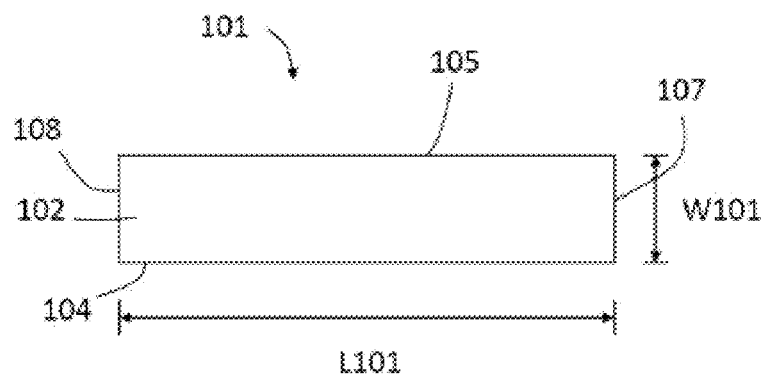

FIG. 5C presents an end view of the splice protector of FIG. 5A.

Figure 5D:
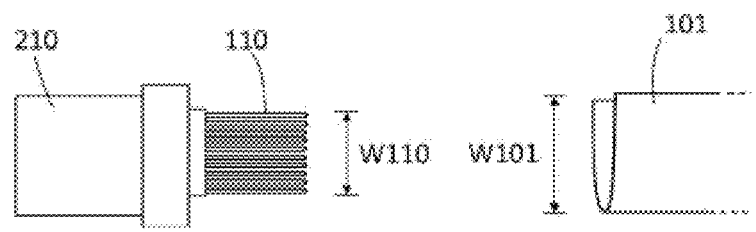

FIG. 5D presents the splice protector of FIG. 5A. It is shown aligned with the multi-fibre ferrule of FIG. 3.

Figure 5E:
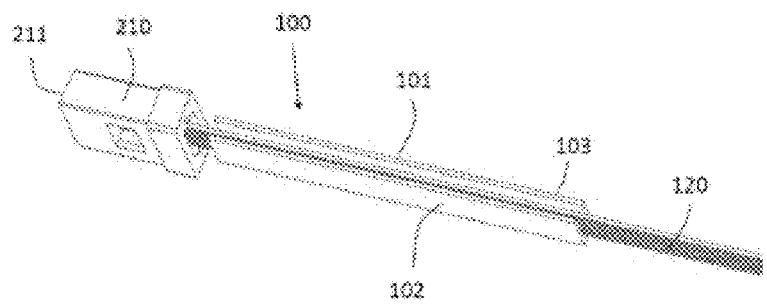

FIG. 5E presents the splice protector of FIG. 5A positioned on the splice site delimited between the optical fibre stubs of the multi-fibre ferrule of FIG. 3 and the corresponding optical fibres of an optical cable.

Figure 6A:
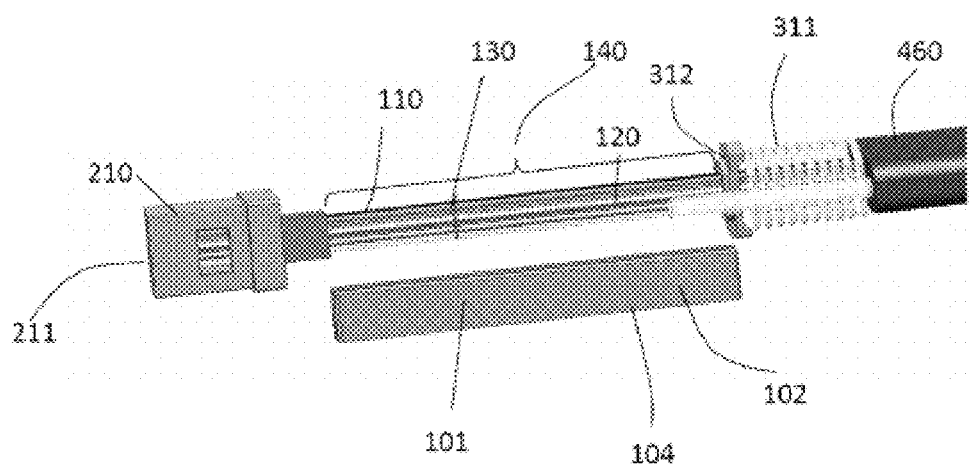
Figure 6B:
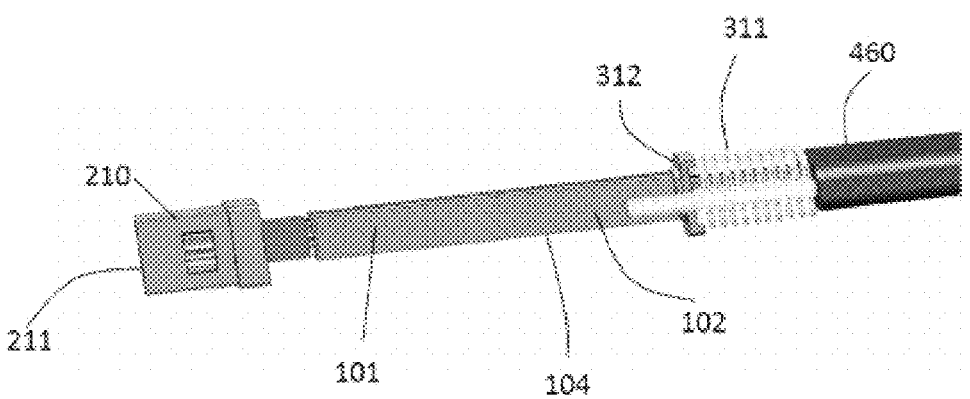
Figure 6C:
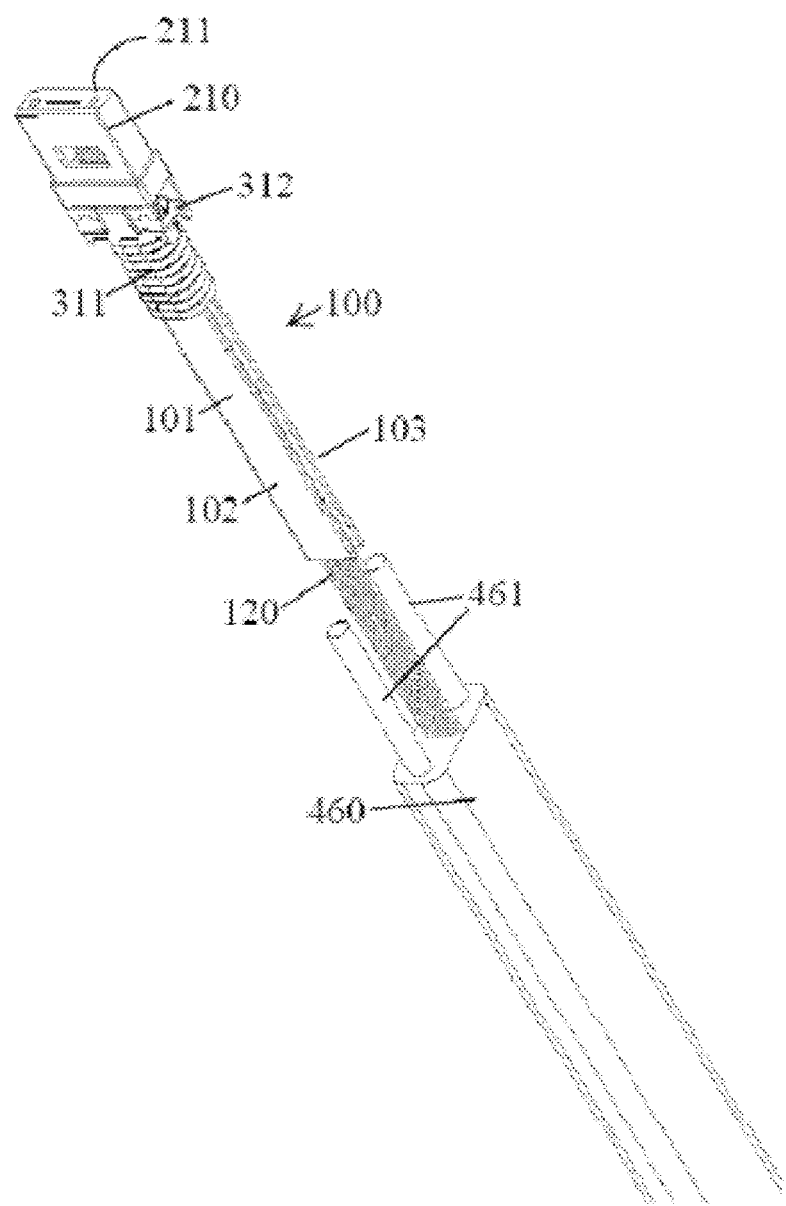

FIGS. 6A through 6C display exemplary assembly steps for installing the splice protector of FIG. 5A on the multi-fibre splice site.

Figure 7A:
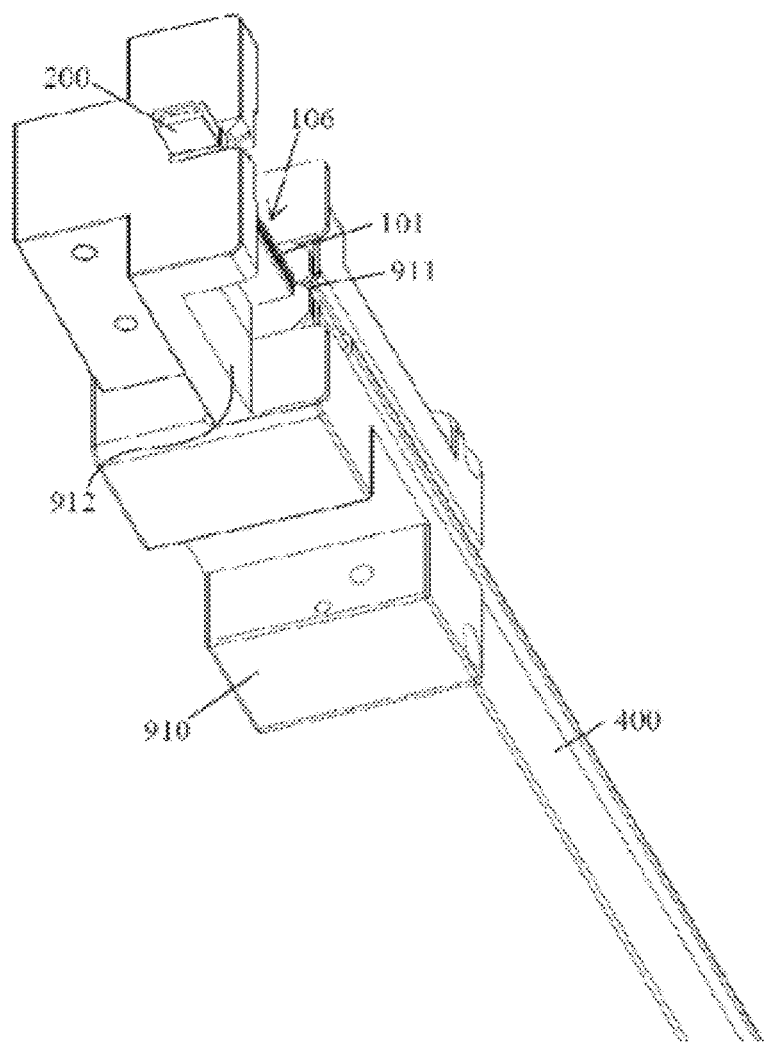

FIG. 7A presents an assembly component for facilitating installation of the splice protector of FIG. 5A on a multi-fibre splice site.

Figure 7B:
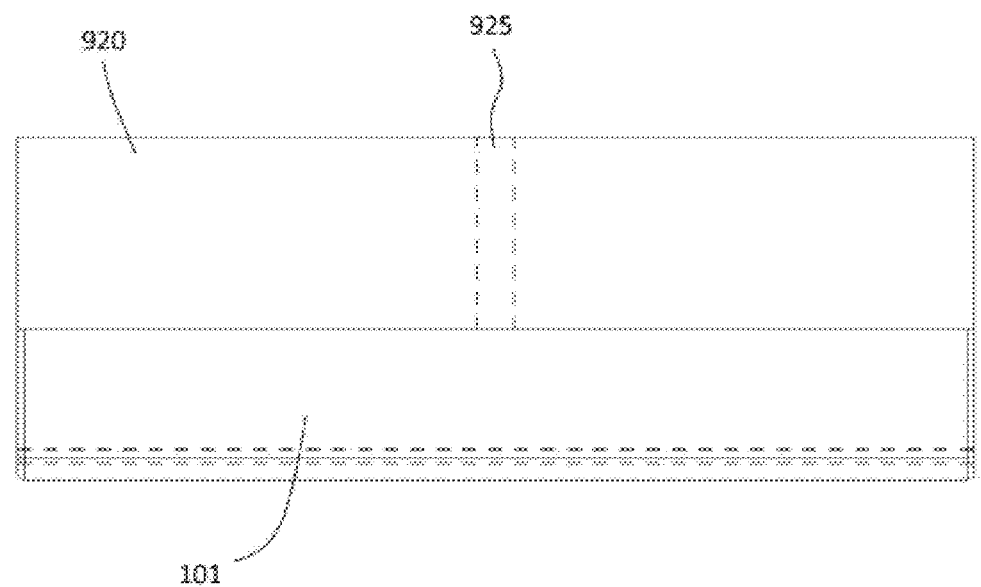

FIG. 7B presents the cover for the assembly component of FIG. 7A.

Figure 2:
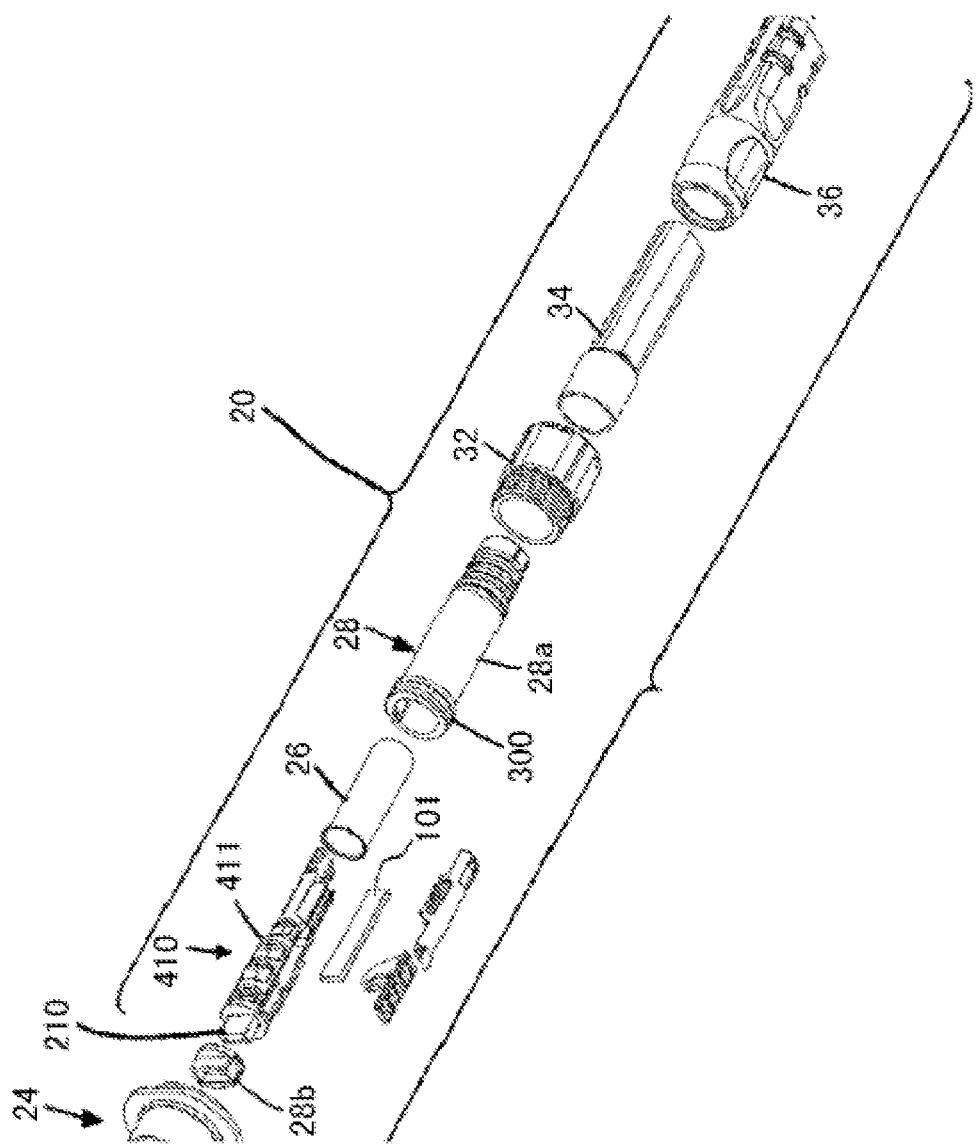
FIG. 2 is an exploded view of the optical cable connector device in FIG. 1.
Figure 8A:
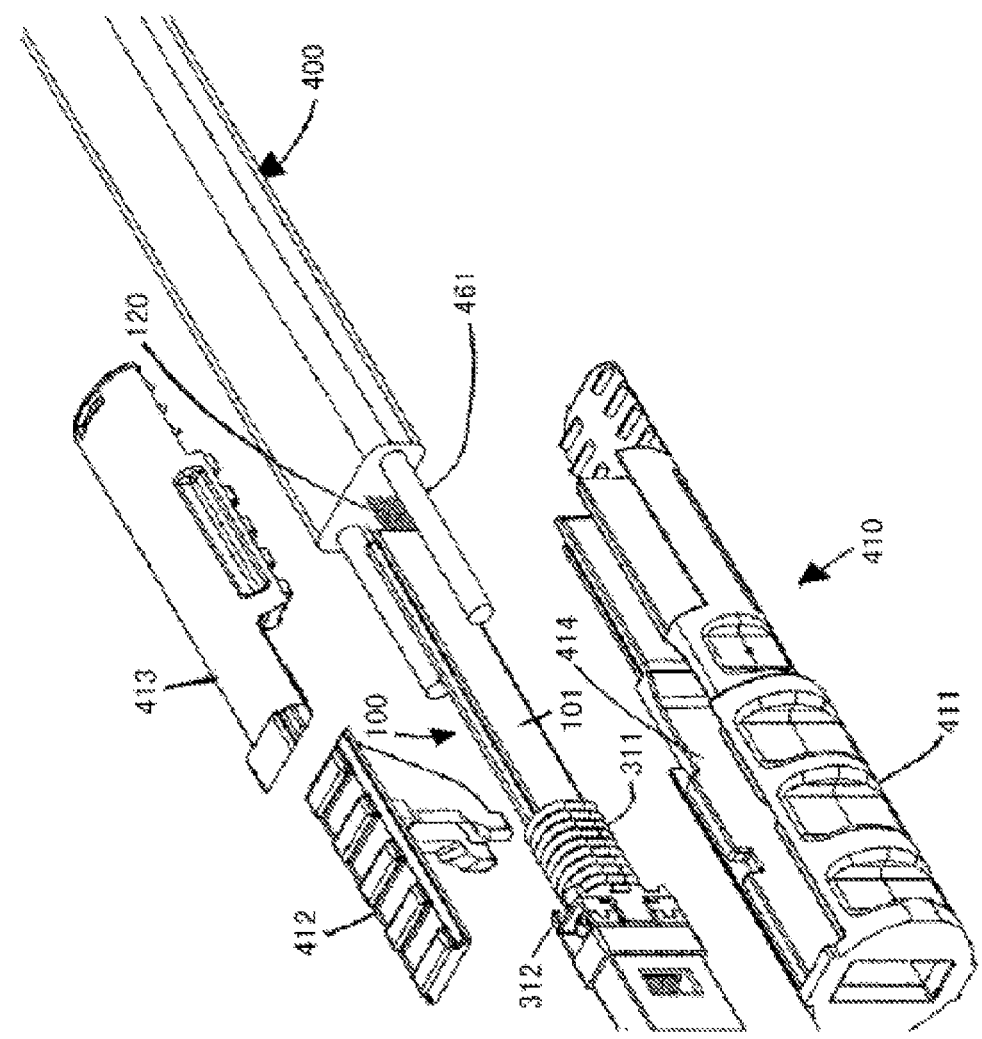
Figure 8B:
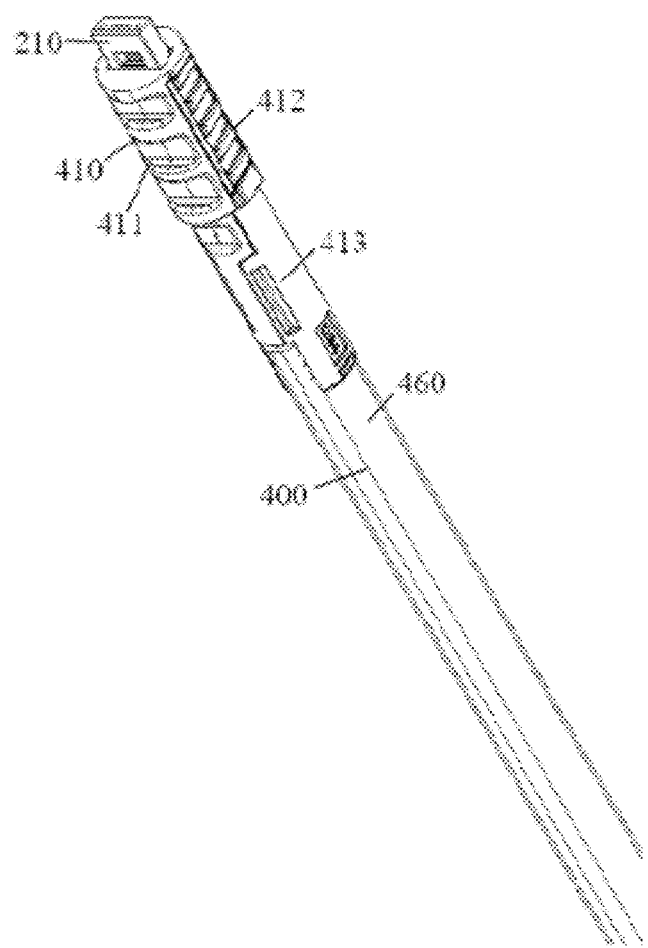

FIGS. 8A and 8B display the assembly steps for internal components of the optical cable connector device of FIG. 2.

Figure 9A:
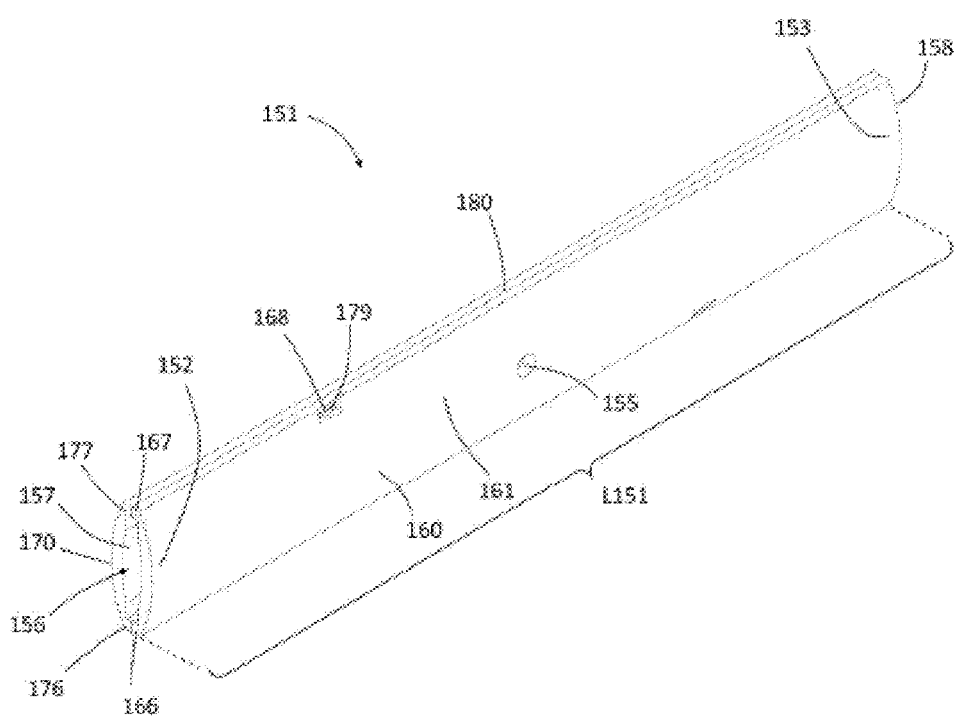

FIG. 9A is a perspective view of another splice protector based on various aspects of the present invention.

Figure 9B:
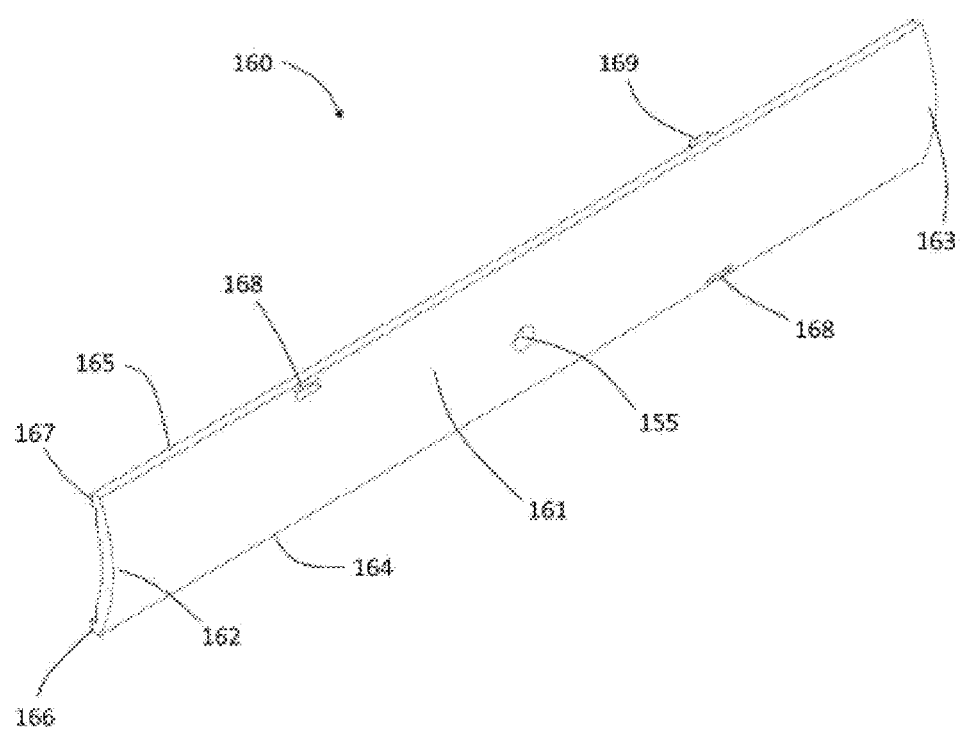

FIG. 9B is a perspective view of a part of the splice protector of FIG. 9A.

Figure 9C:
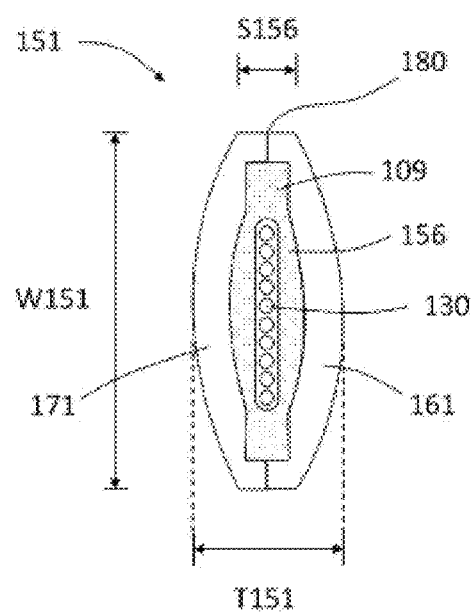

FIG. 9C is a cross-sectional view of the splice protector of FIG. 9A.

Figure 9D:
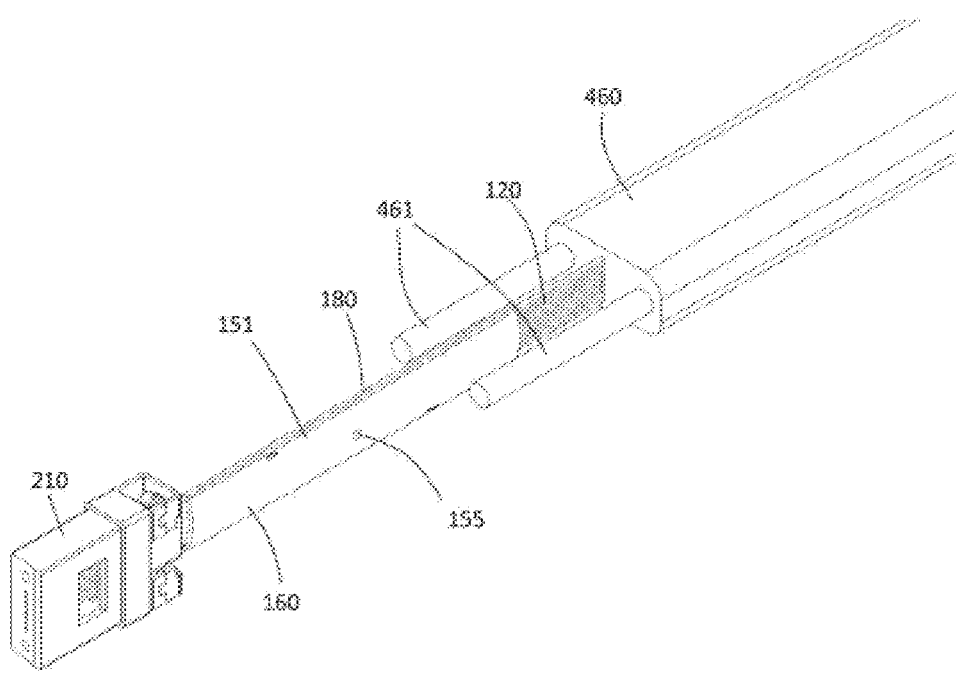

FIG. 9D presents the splice protector of FIG. 9A positioned on the splice site delimited between the optical fibre stubs of the multi-fibre ferrule of FIG. 3 and the corresponding optical fibres of an optical cable.

SPECIFIC EMBODIMENTS

The guiding principles of the present disclosure relate to a splice-strengthening structure and methods for its application. In certain embodiments, the splice-strengthening structure is constructed so as to effectively mount and protect a multi-fusion-splice site. Some examples of a splice-strengthening structure according to principles of the present invention have a low profile and are constructed so as to be easily mounted in a splice-on connector body. In certain embodiments, the splice-strengthening structure according to principles of the present invention has a low-profile splice protector sleeve. Said low-profile splice protector sleeve is used in combination with a curable splice protection material. Said curable splice protection material fills the sleeve and the splice packaged and positioned within the sleeve. In some examples, the splice protector sleeve has a U-shaped profile when viewed longitudinally. In some examples, the splice protector sleeve has long, thin, low-profile construction. It has a first side wall, a second side wall opposite the first side wall, a third wall connecting the first side wall and the second side wall, a longitudinal open side opposite the third wall, and open ends. In some embodiments, the splice protector sleeve comprises two or more matching parts (e.g., two halves). Every aspect of the present invention is applicable to hardened and non-hardened splice-on connectors.

Figure 1:
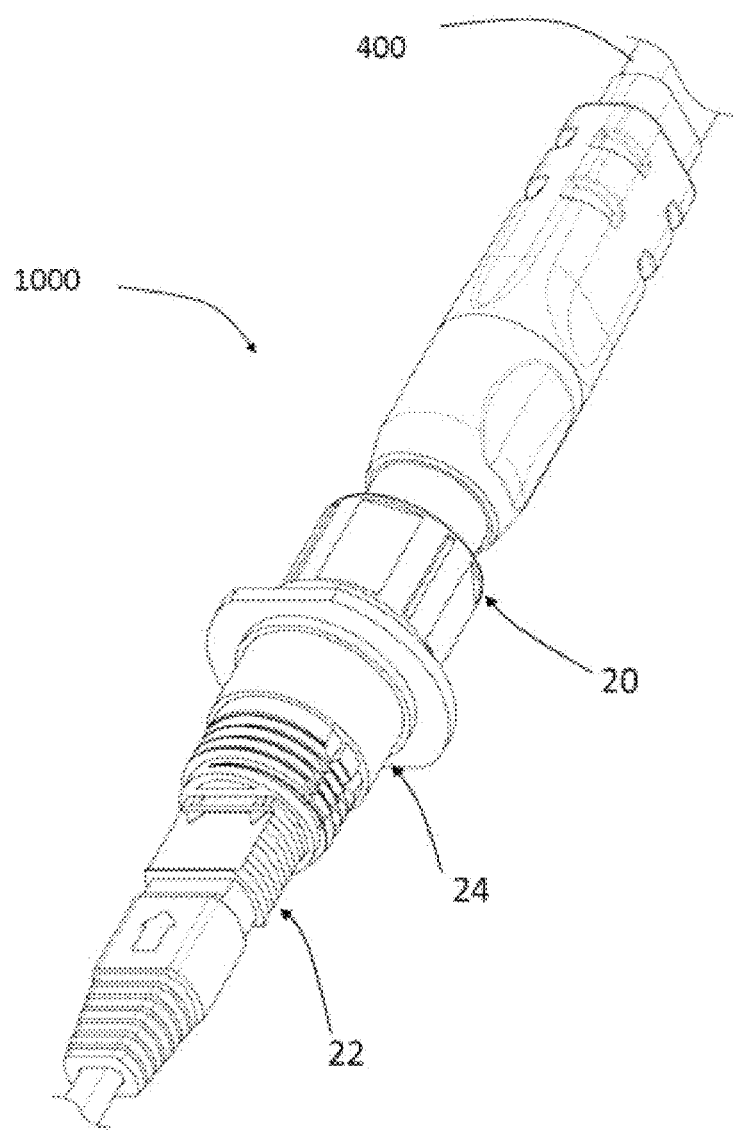

FIG. 1 and FIG. 2 show an exemplary, multi-aspect optical fibre connector device 1000 suitable for implementing the present invention. The optical fibre connector device 1000 comprises a hardened multi-fibre optical connector 20. This multi-fibre optical connector 20 is optically coupled to a non-hardened multi-fibre optical connector 22 (e.g., an MPO connector) via an optical fibre adapter 24. The optical fibre adapter 24 is constructed for installation within a housing or on a panel and is limited to receiving the hardened and sealed port of the hardened multi-fibre optical connector 20 and receiving the non-hardened port of the non-hardened multi-fibre optical connector 22.

Refer to FIG. 2. The hardened multi-fibre optical connector 20 is a splice-on connector coupled to an optical cable 400. The optical cable 400 comprises multiple optical fibres 120 (e.g., single-core or multi-fibre ribbon) contained within a sheath 460. The optical cable 400 further comprises strength members 461. The strength members are for providing optical cable 400 stretch and compression reinforcement. As shown in the figure, the optical cable sheath 460 has a flat structure. In other embodiments, the optical cable may have other shapes (e.g., a round cable, a butterfly-shaped optical cable, etc.). In certain embodiments, the strength members 461 may comprise strengthening rods delimited by fiberglass reinforced epoxy resin. However, another type of strength member might be used (e.g., aramid fibre).

The hardened multi-fibre optical connector 20 comprises a connector body 410. The connector body 410 supports a multi-fibre ferrule 210 at the front end of the connector body 410. The multi-fibre ferrule 210 is pressed upward, in a forward direction relative to the connector body 410, by a spring. The hardened multi-fibre optical connector 20 further comprises a strengthening sleeve 26 and a housing 28 which fit over the connector body 410. The housing 28 comprises a thin length 28a that fits over the strengthening sleeve 26 and an end cap 28b that fits over the multi-fibre ferrule 210. A sealing part 30 may be disposed on the thin length 28a and is for forming a seal with the optical fibre adapter 24 when the hardened multi-fibre optical connector 20 is secured in the hardened port of the optical fibre adapter 24. The hardened fastener 32 is provided for securing the hardened multi-fibre optical connector 20 in the hardened port of the optical fibre adapter 24. In the embodiment described, the fastener is a twist-lock fastener. It is shown as an external-thread nut. Said external thread binds with the corresponding internal thread delimited internally by the hardened port of the optical fibre adapter 24. In another example, another type of twist-lock fastener may be used such as a snap fastener or alternatively an interior thread sleeve. The hardened multi-fibre optical connector 20 further comprises a shape-memory sleeve 34 (e.g., heat-shrink tubing), which provides a seal between the optical cable sheath 460 and the housing 28. The hardened multi-fibre optical connector 20 further comprises a strain-relief sleeve 36, which provides bending-radius protection and strain relief at the interface between the optical cable 400 and the housing 28.

The connector body 410 of the hardened multi-fibre optical connector 20 may comprise a main body 411, a first cover part 412, and a second cover part 413. In the example shown, the first cover part 412 and the second cover part 413 are installed on the longitudinal-side opening 414 of the main body 411. The cover part 412 may comprise a part that serves as a spring retainer. After the optical fibre stubs 110 (refer to FIGS. 3 and 4) supported by the ferrule 210 have undergone multiple fusion splicing at the splice site 130 with the optical fibres 120 of the optical cable 400, the longitudinal-side opening 414 permits the ferrule 210 to be laterally installed into the main body 411. In the example, the splice site 130 is protected by the splice protection system 100. The splice protection system 100 comprises a splice protector sleeve 101 (refer to FIGS. 2, 6A, and 6B) and adhesive cement 109 (refer to FIG. 5B).

FIG. 3 presents a multi-fibre ferrule assembly 200. The multi-fibre assembly 200 comprises an ferrule 210. The ferrule 210 supports multiple stubs having multiple optical fibres 110. The ferrule comprises a front end 211. The front end 211 is positioned opposite the back end 212. The optical fibres 110 preferably are aligned within the ferrule in a row structure. The row structure of the optical fibres 110 has a width W110. The optical fibres 110 extend through the ferrule 210, with the short lead-out end 111 extending out from the rear end 212 of the ferrule 210 and from the optical fibre 110 front ends 112 located at the front end 211 of the ferrule 210. The front ends 112 of the optical fibres 110 are polished. It is possible to access the polished front ends 112 at the front end 211 of the ferrule 210.

FIG. 4 presents an optical cable 400. The optical cable 400 has optical fibres 120 that are spliced to the optical fibres 110 of the ferrule assembly 200 at the splice site 130. Generally, the ends of the exposed optical fibres 110 and 120 are fused together using an energy source (e.g., electric arc), and thus the optical fibres 110 and 120 are spliced together.

The exposed part 140 of the optical cable 400 is preferably protected to prevent breaks. FIGS. 5A through 5E are diagrams of the splice protection system 100 according to the principles of the present disclosure. As shown in the figures, the splice protection system 100 comprises a splice protector sleeve 101. The splice protector sleeve 101 has a width W101, a length L101 delimited by the first end 107 and the second end 108, and a thickness T101 delimited by a first main side and a second main side. The first main side and the second main side comprise a first main-side wall 102 and a second main-side wall 103. The first main-side wall 102 and the second main-side wall 103 are separated by an internal space 106 having the distance (i.e., thickness) S106. The main-side walls 102 and 103 may be roughly rectangular. The splice protector sleeve 101 further comprises first and second longitudinal secondary sides located opposite to each other and comprising a closed secondary wall 104 connected to the first side wall 102 and second side wall 103 and an open side 105. The splice protector sleeve 101 further comprises open lateral secondary sides 107 and 108. In the example, the width W101 is greater than the thickness T101. The width W101 may be, for example, at least three times as large as thickness T101, at least four times thickness T101, or at least five or six times its thickness. In the example shown, the splice connector sleeve 101 has a U-shaped cross-section (FIG. 5C). The U-shaped cross-section could be round, V-shaped, rectangular, or rectangular with rounded corners. The width W101 of the splice protector sleeve 101 is preferably greater than the width W110 of the optical fibres 110 row structure at the splice site 130, so that when the splice site 130 is placed within the internal space 106 of the splice protector sleeve 101, the first side wall 102 and second side wall 103 basically envelop the optical fibres 110 along the length of the splice protector sleeve 101.

FIGS. 6A through 6C show assembly and positioning of the splice protector sleeve 101 around the splice site 130. Before splicing the optical fibres 120 of the optical cable 400 to the optical fibres 110 of the ferrule assembly 200, a certain length of the sheath 460 is stripped away, and protective coating is removed from the optical fibres 120 to expose the optical fibres 120. Then the exposed optical fibres 120 are passed through the central aperture in the spring 311 and an optional spring cover 312, thus placing the spring 311 and the optional spring cap 312 over the optical cable 400. The optical fibres 110 and 120 preferably are spliced together by fusion splicing.

According to one embodiment, before the exposed part 140 is placed into the splice protector sleeve 101, adhesive cement 109 is injected into the internal space 106 of the splice protector sleeve 101. In an alternative embodiment, the exposed part 140 is placed in the splice protector sleeve 101 prior to injection of the adhesive cement 109. The adhesive cement is then injected into the internal space 106 of the splice protector sleeve 101, filling the gaps between the optical fibres 110 and 120 and the splice protector sleeve 101. In this manner, the adhesive cement packages the optical fibres and the splice site, thus stabilising and mechanically strengthening the splice site 130.

In an example, the adhesive cement is injected into the internal space 106 through an open side (e.g., the open longitudinal side 105). In another embodiment, the splice protector sleeve 101 comprises at least one port 115 on a wall of the splice protector sleeve 101. For example, one or more ports 115 could be positioned on the first main-side wall 102, the second main-side wall 103, and/or the secondary wall 104. The adhesive cement 109 could be injected into the internal space 106 through the port 115. In yet another embodiment, a cover 920 comprising a port 925 (refer to FIG. 7B) could be placed on the splice protector sleeve 101 so that it covers at least the open longitudinal side 105. The adhesive cement 109 is injected through the port 925 into the splice protector sleeve 101.

During the process of assembling the splice protector sleeve 101 and the optical fibre cable 400 having the ferrule assembly 200, these may optionally be retained in the mould 910 (refer to FIG. 7A). The mould 910 may comprise a suitably-sized slot 911 for receiving the splice protector sleeve 101. The slot 911 preferably comprises one or more open sides allowing installation of the splice protector sleeve 101 into the mould 910. The slot 911 may be shaped and sized so that, when the splice protector sleeve 101 is placed within the slot 911, the open longitudinal side 105 of the splice protector sleeve 101 is plugged by part of the slot 911 and the side having the port 115 is exposed, which is for injecting the adhesive cement 109. Alternatively, the splice protector sleeve 101 could be placed in the mould 910 with the open longitudinal side 105 facing upwards so that the adhesive cement 109 can be injected through the open side 105. In an example, the mould 910 is suited to receiving a cover 920. For example, the mould 910 could comprise a recess 912. The cover 920 could sit within the recess 912, with the result that, when the splice protector sleeve 101 is disposed within the mould 910, the cover 920 seals the open longitudinal side 105 of the splice protector sleeve 101, and the port 925 of the cover 920 lines up with the open longitudinal side 105 so that the adhesive cement 109 is injected into the splice protector sleeve 101 through the port 925. The mould 910 further helps to hold the cover 920 firmly in a suitable position while the adhesive cement 109 is being injected.

After the adhesive cement 109 is injected, the adhesive cement 109 could, for example be cured by UV radiation or by heating. The types of adhesive cement 109 may comprise UV-curable adhesive cement, heat-curable adhesive cement, or some other suitable adhesive cement. The types of adhesive cement 109 could comprise, for example, epoxy resin or some other type of resin (e.g., an acrylic resin such as cyanoacrylate, polyester resin, or some other suitable resin). In one embodiment, the splice protector sleeve 101 and the adhesive cement 109 provide a flexible splice protection system 100. The flexible splice protection system 100 may be bent without causing damage. The splice protector sleeve 101 may be made from a polymeric material. For example, it may be made from polycarbonate (PC) or polyethyleneimine (PEI) or any other suitable material. In one embodiment, the splice protector sleeve 101 is made of material that can be penetrated by UV light. In one example, the adhesive cement 109 is shown as permanently securing the splice protector sleeve 101 onto the optical cable 400 and covering the exposed part 140.

After the splice protection system 100 has been installed on the splice site, the spring 311 and the spring cover 312 can slide forward over the splice protector sleeve 101 in the direction of the ferrule, bringing the spring cap 312 into contact with the rear end 212 of the ferrule 210. In the example shown, the splice protector sleeve 101 is separate from the ferrule 210. The ferrule 210, the spring 311, the cover 312, and the splice protector sleeve 101 containing the splice site 130 can be mounted in the main body 411 of the connector body 410 through the longitudinal-side opening 414 (see FIG. 8A). The side opening 414 can then be covered by the first cover part 412 and the second cover part 413, and the spring can be secured to the appropriate position by the spring retainer of the cover 412. Adhesive cement can be used to fix the strength members 461 of the optical cable 400 to the rear end of the connector body 410. Other external components of the hardened multi-fibre optical connector may be assembled onto the connector body 410. Clearly, the strengthening sleeve 26, the thin length 28a, the fastener 32, the shape-memory sleeve 34, and the sleeve 36 can slide over the optical cable 400 before splicing and, moreover, slide back on the connector body 410 after the connector body 410 has been assembled.

FIGS. 9A through 9D show an alternative embodiment of a splice protector sleeve 151 according to the principles of the present disclosure. As shown in FIG. 9A, the splice protector sleeve 151 may consist of two half-shells 160 and 170. These half-shells 160 and 170 are connected along longitudinal secondary sides. The splice protector sleeve 151 has a length L151 delimited by a first end 152 and a second end 153, a width W151, and a thickness T151 delimited by a first main side 161 and a second main side 171 (refer to FIG. 9C). In the example, the width W151 is greater than the thickness T151. The width W151 could be, for example, at least twice the thickness T151 or at least three times the thickness T151, or four or five times. The splice protector sleeve 151 further comprises an internal space 156 having the distance S156. The splice protector sleeve 151 further comprises lateral secondary sides 157 and 158 located at the open first end 152 and second end 153.

The first half-shell 160 is described here and is shown in FIG. 9B. The second half-shell 170 may have the same or similar (e.g., mirror) structure as the first half-shell 160. The first half-shell 160 comprises a main-side wall 161 extending from the first end 162 to the second end 163 along the first longitudinal side 164 and the second longitudinal side 165. The first half-shell 160 further comprises a first secondary wall extension 166 extending from the main-side wall 161 along the first longitudinal side 164 and a second secondary wall extension 167 extending from the main-side wall 161 along the second longitudinal side 165. The first half-shell 160 may comprise one or more snap components, comprising one or more snap insertion holes 168 and one or more snap projecting blocks 169. The snap components are suitable for connecting with the corresponding snap components on the second half-shell 170 and serve to secure the half-shells 160 and 170 together to form the splice protector sleeve 151.

When the half-shells 160 and 170 are in the assembled positions shown in FIG. 9D, the snap components 168/179 and 169/178 connect together, and the closed seam 180 is delimited by the first and second secondary wall extensions 166/176 and 167/177. When the splice site 130 is placed in the internal space 156 of the splice protector sleeve 151, the first and second main-side walls 161/171 and the secondary wall extensions 166/176 and 167/177 basically envelope the optical fibres 110 along the splice connector sleeve 151. In the embodiment shown, the splice connector sleeve 151 is separate from the ferrule 210.

In certain embodiments, when there is no permanent housing, the splice site between said multiple first optical fibres and multiple second optical fibres can be protected by coating materials (e.g., packaging materials such as adhesive cement). These materials could be UV-curable materials. A protective coating could be applied by spraying, injecting, or overmoulding, or by another technique. In certain examples, the protective coating materials could be injected or sprayed into, or otherwise fill, a mould around the splice site. Packaging materials could be cured within the mould, and then the mould could be removed from the packaging material. In certain embodiments, a splice site protected by sealing agent that lacks housing could be contained within the connector body of a vibration-resistant optical fibre connector of a type described above (e.g., the hardened multi-fibre connector 20). This vibration-resistant optical fibre connector has a twist-lock fastener. This twist-lock fastener is for securing the vibration-resistant optical fibre connector in the matching port of a vibration-resistant optical fibre adapter. A sealing part may be disposed between the vibration-resistant optical fibre connector and vibration-resistant optical fibre adapter.

Although some embodiments of the present invention have been described, other embodiments may exist. The particular features and actions described above are disclosed as illustrative aspects and embodiments of the present invention. After reading the descriptions herein, a person with ordinary skill in the art could become inspired with various other aspects, embodiments, modifications, and other equivalents without departing from the spirit of the present invention or the scope of the subject matter of the claims.

LIST OF PARTS 20 hardened multi-fibre connector
22 non-hardened multi-fibre optical connector
24 optical fibre adapter
26 strengthening sleeve
   28 housing
   28a thin length
28b cover
30 sealing part
32 fastener
34 shape-memory sleeve
36 strain-relief sleeve
100 splice protection system
101 splice protector sleeve
   L101 length
   W101 width
   T101 thickness
102 first main-side wall
103 second main-side wall
104 closed secondary wall
105 open side
106 internal space
   S106 distance
107 first end
108 second end
109 adhesive cement
110 optical fibres (stubs)
   W110 width
115 port
120 optical fibres
130 splice site
140 exposed part
151 splice protector sleeve
   T151 thickness
   W151 width
155 port
156 internal space
   S156 distance
157 first secondary side
158 second secondary side
160 first half-shell
161 first main wall
162 first end
163 second end
164 first longitudinal side
165 second longitudinal side
166 first secondary wall extension
167 second secondary wall extension
168 snap insertion hole
169 snap projecting block
170 second half-shell
   171 first main wall
   172 first end
   173 second end
   174 first longitudinal side
   175 second longitudinal side
   176 first secondary extension
   177 second secondary extension
   178 snap insertion hole
   179 snap projecting block
180 seam
200 ferrule assembly
210 multi-fibre ferrule
211 front end
212 rear end
311 spring
312 spring cap
400 optical cable
410 connector body
411 main body
412 first cover part
413 second cover part
414 longitudinal slot
460 sheath
461 strength member
910 mould
911 slot
920 cover
925 port
1000 optical fibre connector device

The invention claimed is:

1. A fiber optic cable assembly comprising:
a connector body;
a ferrule;
at least one optical fiber stub supported by the ferrule; and
a housing mounted over the ferrule;
a fiber optic cable including at least one optical fiber contained within a sheath, the at least one optical fiber being spliced at a splice site to the at least one optical fiber stub; and
a splice protector sleeve positioned around the splice site and mounted within the connector, wherein the splice protector sleeve comprises:
a first side wall;
a second side wall opposite the first side wall;
a third wall connecting the first side wall and the second side wall;
an open side opposite the third wall, wherein an internal space is defined between the first and second side walls in a region between the open side and the third wall; and
wherein the open side allows insertion of the splice site into the internal space delimited by the first, second, and third walls of the splice protector sleeve;
a splice protection material arranged inside the internal space of the splice protector sleeve and around the splice site; and
a spring positioned around the splice protector sleeve.

2. The fiber optic cable assembly of claim 1, wherein the splice protector sleeve has a U-shaped cross-sectional profile.

3. The fiber optic cable assembly of claim 1, further comprising a fastener configured to secure the connector to a port of an adapter, wherein the fastener is a twist-lock fastener that is configured to slide over the sheath of the fiber optic cable before the at least one optical fiber is spliced to the at least one optical fiber stub of the connector.

4. The fiber optic cable assembly of claim 1, further comprising:
a shape-memory sleeve configured to provide a seal between the sheath of the fiber optic cable and the housing of the connector.

5. The fiber optic cable assembly of claim 1, further comprising a cover enclosing the splice protector sleeve inside the connector body.

6. A kit for a fiber optic cable assembly, the kit comprising:
a connector including:

a connector body, the connector body defining an opening;
a ferrule mounted to one end of the connector body; and
at least one optical fiber stub supported by the ferrule; and
a splice protector sleeve configured to protect a splice site between the at least one optical fiber stub and at least one optical fiber of a fiber optic cable, and to be installed into the opening of the connector body, wherein the splice protector sleeve comprises:
a first side wall;
a second side wall opposite the first side wall;
a third wall connecting the first side wall and the second side wall;
an open side opposite the third wall; and
open ends;
wherein the open ends allow insertion of the splice site into a space delimited by the first, second, and third walls of the splice protector sleeve; and
a mold having a base and a cover, the cover being constructed to seal the open side of the splice protector sleeve, and including an injection port for injecting a curable splice protection material in the splice protector sleeve.

7. The kit of claim 6, further comprising:
the curable splice protection material for disposal in the splice protector sleeve and for encapsulating the splice site.

8. The kit of claim 6, wherein the splice protector sleeve has a U-shaped cross-sectional profile, and is made of material that can be penetrated by UV light.

9. The kit of claim 6, further comprising:
a connector housing configured to be mounted over the connector body after the splice protector sleeve is installed into the opening of the connector body.

10. A method of assembling a fiber optic cable assembly, the method comprising:
splicing at least one optical fiber stub to at least one optical fiber from a cable to create a splice site between the at least one optical fiber stub and the at least one optical fiber;
inserting the splice site into a splice protector sleeve;
disposing a curable splice protection material into the splice protector sleeve, the curable splice protection material filling a space between the splice site and the sleeve, wherein disposing the curable splice protection material into the splice protector sleeve includes injecting the curable splice protection material into the splice protector sleeve through an injection port of a mold;
curing the curable splice protection material; and
mounting the splice protector sleeve into a connector body.

11. The method of claim 10, wherein the injection port of the mold injects the curable splice protection material into an open side of the splice protector sleeve.

12. The method of claim 10, wherein the curable splice protection material is cured by UV radiation or by heating.

13. The method of claim 10, wherein the splice protector sleeve and the curable splice protection material provide a flexible splice protection system.

* * * * *